3,519,685
Patented July 7, 1970

3,519,685
PROCESS RELATING TO ALKYLPHOSPHONOUS DIHALIDES
Charles F. Baranauckas and Edward E. Harris, Niagara Falls, N.Y., assignors to Hooker Chemical Corporation, Niagara Falls, N.Y., a corporation of New York
Continuation of application Ser. No. 347,932, Feb. 27, 1964. This application May 14, 1968, Ser. No. 729,128
Int. Cl. C07f 9/52
U.S. Cl. 260—543       6 Claims

ABSTRACT OF THE DISCLOSURE

A process for separating an alkylphosphonous dihalide from a mixture of such compound and phosphorus trihalide by addition of an organic passivating agent, such as an alcohol, a polyhydric alcohol or other hydric compound to the mixture, to react with a substantial proportion of the phosphorus trihalide, and then recovering the alkylphosphonous dihalide by a suitable process, such as distillation.

Figure 1:
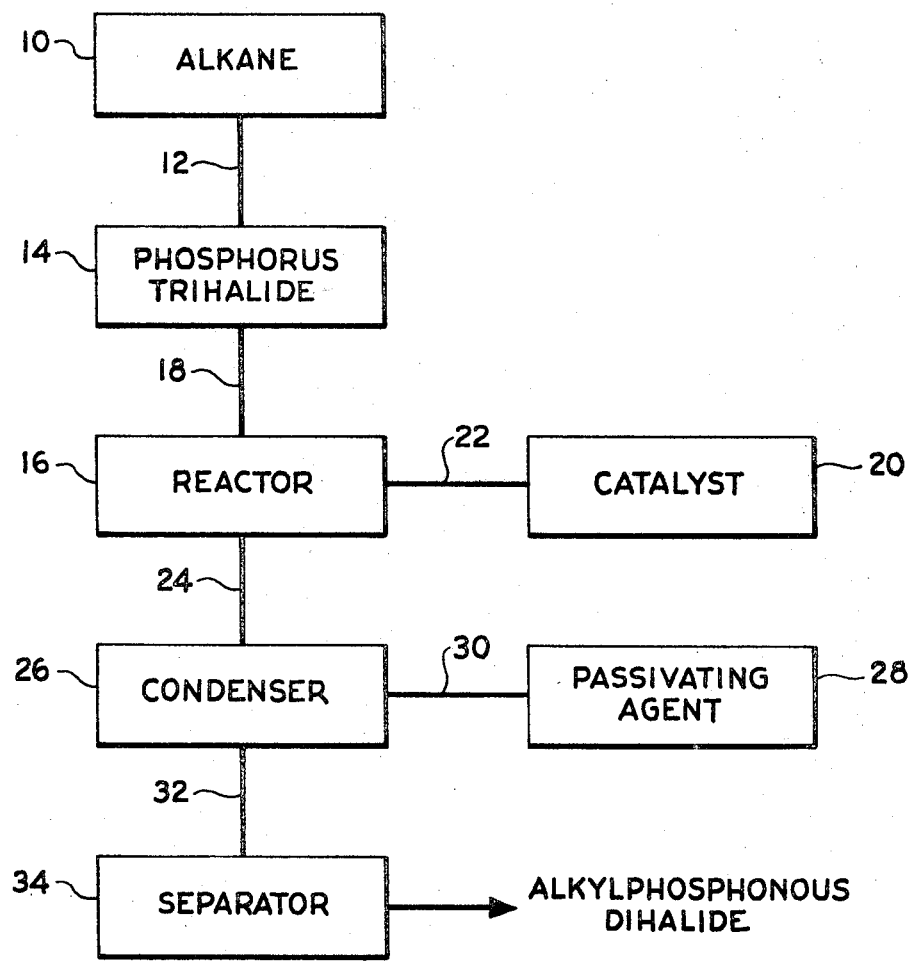

This application is a continuation of our application S.N. 347,932, filed Feb. 27, 1964, now abandoned.

This invention relates to the preparation and separation of alkylphosphonous dihalides. More particularly, it relates to the separation of lower alkylphosphonous dihalides from a reaction mixture.

It has recently been reported that methane and ethane will react with phosphorus trichloride to produce an alkylphosphonous dichloride. The conversion was shown to be substantially improved when carried out in the presence of catalytic amounts of oxygen. However, when methylphosphonous dihalide is prepared in this manner the product is not readily separated from the reaction mixture because its boiling point is approximately the same as that of unreacted phosphorus trihalide remaining in the reaction mixture. This closeness in boiling points of methylphosphonous dihalide and phosphorus trihalide requires the careful separation of the lower alkylphosphonous dihalide and adds considerably to the cost of this process, making it less attractive for commercial production of alkylphosphonous dihalide. These compounds are useful as metal extractants, additives to lubricating oils, chemical intermediates and additives in resin and polymer systems.

An object of this invention is to prepared alkylphosphonous dihalides.

A further object of this invention is to separate alkylphosphonous dihalides in a commercially efficient manner.

In accordance with this invention it has been found that an alkylphosphonous dihalide may be prepared and separated by reacting an alkyl hydrocarbon having from 1 to about 4 carbons with a phosphorus trihalide selected from the group consisting of phosphorus trichloride and phosphorus tribromide, in the presence of a catalyst to form a reaction mixture containing an alkylphosphonous dihalide, adding a passivating agent that will react preferentially with unreacted phosphorus trihalide, and recovering the alkylphosphonous dihalide. Further, it has been surprisingly found that in addition to the discovery of a commercially acceptable process, i.e., the addition of a compound which reacts preferentially with phosphorus trihalide to facilitate the removal of the alkylphosphonous dihalide, it has been found that new catalysts, e.g., chlorine, carbon tetrachloride and carbon tetrabromide, may be utilized to prepare an alkylphosphonous dihalide having the formula

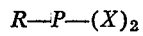

wherein R is an alkyl having from 1 to 4 carbons and X is selected from the group consisting of chlorine and bromine.

For a more detailed illustration of the invention, reference is made to the following description and accompanying drawing which illustrates, but does not limit the practice of this invention. As is seen from FIG. 1, an alkane, which may be methane, ethane, propane, butane, isobutane, or suitable mixtures thereof, is passed from reservoir 10 through conduit 12 to container 14 where it is contacted with a phosphorus trihalide held at a temperature which will vaporize the desired amounts of reactants for a proper desired molar ratio thereof, e.g., from about 15 to 35 degrees centigrade, preferably from about 20 to 30 degrees centigrade. The molar ratio of the reactants, alkane to phosphorus trihalide, may be stoichiometric, but it is preferred to utilize an excess of alkane so that a molar ratio of alkane to phosphorus trihalide may be from about 2:1 to 12:1, with the most preferred mole ratios being from about 2.5:1 to 6:1. The gas mixture emitted from container 14 passes to reactor 16 via conduit means 18. A suitable catalyst from catalyst reservoir 20 is added to the reactor 16 near the top thereof via line 22. Gaseous products, unreacted reactants and byproducts are then carried through line 24 to be condensed in condenser 26. A passivating agent, which is a compound or mixture of compounds that will react readily with phosphorus trihalide and less readily with alkylphosphonus dihalide, is added to the reaction mixture from container 28 to condenser 26 via conduit 30. The product is distilled after adding the passivating agent by conveying the reaction mixture via line 32 to separating means 34 where the desired product, alkylphosphonous dihalide, is separated. The product remaining after separation of phosphonous dihalide may be conveyed to a system where a phosphorus containing compound is utilized as a reactant, e.g., if phenol is the passivating agent the remaining phosphorous esters of phenol may be conveyed to a system where triphenyl phosphite is produced. The flow diagram, as stated above, is utilized herein for descriptive purposes only, and the process is not to be limited in any manner by this flow diagram, it being realized that the process may be adopted to batch, continuous and recycle processes, as required by circumstances.

The reactions that take place in reactor 16 are carried out at temperatures of from about 400 to about 700 degrees centigrade. The temperature employed is determined to an extent by the alkane reactant utilized, since decomposition of the alkane is to be avoided in the practice of this invention. The residence time of the reactants within the reaction zone of reactor 16 also depends upon the alkane reactant. Residence times of from 0.1 second to 20 seconds are satisfactory and the most preferred residence time for the reactants is from about 0.3 to 10 seconds.

The amount of catalyst utilized in the preparation of the alkylphosphonous dihalide may vary from about .001 to 5 moles per mole of alkane, a preferred range being from about 0.001 to 2 moles per mole of alkane and the most preferred amount being from about .01 to .03 mole of catalyst per mole of alkane.

Examples of passivating agents which react preferentially with phosphorus trihalides are aldehydes and ketones, such as acetaldehyde, acetone, para-chlorobenzaldehyde, benzaldehyde, valeraldehyde, formaldehyde, and so forth, mononuclear, dinuclear and polynuclear hydric compounds that contain hydrogen, halogen, and other inert substituents, if any, that are inert to reaction conditions, such as, monohydric alcohols, methanol, butanol, heptanol, polyhydric alcohols, glycerine, 2,3-dimethyl-1,2-butanediol, 1,7-heptanediol, 3,4-diethyl-3,4-hexanediol, phenol, hydroquinone, $\alpha$-napthol, bisphenol-A, para cresol, 2-methyl-$\alpha$-naphthol, polypropylene glycol, mono-, di- and tri- pentaerythritol, propylene glycol, trimethylolpropane, dipropylene glycol, 2,4-xylenol, butylphenol, methylbutenol, methyl hydroxy butanone, chloromethyl butynol, dimethyl octadiynediol, 2,4-dihydroxylbenzophenone, and so forth, mercaptans such as methyl, ethyl, butyl, propyl, amyl, hexyl, octyl, nonyl, decyl, lauryl, cetyl, octadecyl, stearyl, benzyl, phenyl and substituted phenyl mercaptans and so forth, and mixtures thereof, dithiols such as ethanedithiol, propane-1,2-dithiol, bytylene-2,3-dithiol, propane-1,3-dithiol, hexane-1,6-dithiol and so forth, and mixtures thereof, aryl-substituted-alkyl mercaptans and heterocyclic mercaptans such as para-nitrobenzyl mercaptan, phenylethyl mercaptan and furfuryl mercaptan, and so forth, alkenyl mercaptans, such as allyl mercaptan, methallyl mercaptan, crotyl mercaptan (1-butene-4-thiol), and so forth, and mixtures thereof, amines, such as methylamine, dimethylamine, aniline, ethylene diamine, methyl aniline, and so forth, oximes such as acetone oxime, acetaldehydeosime, hydroxyamines, hydroxylamine, ethanolamine, p-aminophenol, and so forth, organic acids, such as acetic, benzoic, oxalic, phthalic acids, and so forth, and mixtures thereof, organometallics, such as, Grignard reagents, magnesium chloride, lithium methylate, sodium phenoxide, zinc diethyl, aluminum trimethyl, silicon tetraethyl and tin tripropyl and other organo-zinc, -aluminum and -tin compounds and silicate esters, cyclic ethers and thioethers, such as ethylene oxide, ethylene carbonate, propylene sulfide and inorganic reagents such as water, ammonia, ammonium triocyanate, potassium cyanide, hydrogen iodide, potassium iodide, and so forth. The preferred passivating agents being straight chain aliphatic hydrocarbyl aldehydes and ketones having from 1 to about 18 carbons, phenolic compounds having from 6 to 18 carbons, tertiary acid phosphates having from 1 to 18 carbons in each ester group and, anilines. It is to be understood that competing reactions may occur between the phosphorus trihalide and the alkylphosphonous dihalide when some of the above agents are added to the reaction mixture. However, the rate of reaction of the passivating agent with phosphorus trihalide is greater than that with the alkylphosphonous dihalide. Thus, the alkylphosphonous dihalide is readily separated by distillation causing a minimum to remain in the reaction mixture. It is to be further understood that the above compounds react with phosphorus trihalide to form products having different boiling points, than the alkyl phosphonous dihalide. The difference is at least from 10 to 300 degrees centigrade. Although it is believed that the passivating compound added reacts preferentially with the phosphorus trihalide and this explanation satisfactorily explains the surprising results of the invention, other factors may also be involved and the invention is not to be considered as limited other than by the claims.

The following examples illustrate the invention, but do not limit it. All parts are by weight, moles are gram moles, and temperatures are in degrees centigrade unless otherwise stated.

EXAMPLES 1 TO 3

Utilizing the procedure described above, methane gas was passed through phosphorus trichloride maintained at from about 25 to 27 degrees centigrade. The mole ratio of methane to chlorine mixture conveyed to the reaction vessel 16 was 3.4. This mixture was passed through the reaction vessel held at a temperature of from about 555 to 565 degrees centigrade so that the reactants had a retention time of from about 0.3 to 0.5 second. The product was distilled at aobut 100 degrees centigrade.

The catalysts set forth in Table I were added in an amount of .02 mole of catalyst per mole of methane.

TABLE I.— PREPARATION OF ALKYLPHOSPHONOUS DIHALIDE

|  | Example 1 | Example 2 | Example 3 |
|---|---|---|---|
| Catalyst | None | Chlorine | Oxygen |
| Conversion (percent by weight) | 10.8 | 14.9 | 22.5 |

EXAMPLE 4

The procedure of Example 1 was repeated utilizing 0.2 part of carbon tetrabromide per mole of methane as a catalyst. The temperature of the reaction zone was maintained at from about 545 to 555 degrees centigrade. The mole ratio of methane to phosphorus trichloride was about 2.5. The flow rate of the phosphorus trihalide-methane mixture was about 0.05 mole per minute. The products contained about 8.6 percent methylphosphonous dichloride. A similar run without added catalyst yielded a product containing 2.5 percent methyl phosphonous dichloride.

EXAMPLE 5

The procedure of Example 4 was repeated utilizing carbon tetrachloride as a catalyst. The product recovered contained about 7.0 percent methyl phosphonous dichloride.

EXAMPLES 6 TO 8

In the following examples 1000 parts of a mixture of phosphorus trichloride and methyl phosphonous dichloride (760 parts phosphorus trihalide, 180 parts methyl posphonous dichloride, and the remainder comprising the byproducts of a reaction between methane and phosphorus trichloride) were charged to a reaction vessel. This mixture was heated to a temperature of about 40 degrees centigrade and phenol was added over a period of 1½ hours as set forth in Table II. The mixture was then heated at 80 degrees centigrade for 5 hours. The product was distilled at 100 degrees centigrade. The distillate was analyzed and was found to contain methylphosphonous dichloride in amounts indicated in Table II.

TABLE II.—PHENOL PASSIVATING AGENT

| | Amount phenol, parts | Percent methyl phosphonous dichloride in the distillate |
|---|---|---|
| Example: | | |
| 6 | 522 | 54 |
| 7 | 750 | 75 |
| 8 | 1,044 | 96 |

These examples illustrate the effective utilization of phenol as a passivating agent.

EXAMPLE 9

Phenol (522 parts) was added to the distillate of Example 6 to simulate a recycling system and the procedure of Example 6 was followed. The distillate of Example 9 showed a concentration of 96 percent methylphosphonous dichloride when a sample was subjected to analysis.

EXAMPLE 10

The process of Example 8 was repeated with the order of addition of the reactants being reversed. A distillate which showed a 96 percent concentration of methylphosphonous dichloride on analysis was recovered.

EXAMPLES 11 TO 16

Example 6 was repeated utilizing the passivating agents set forth in Table III.

TABLE III

| Passivating agent | Amount, parts | Percent methylphosphonous dichloride in the distillate |
|---|---|---|
| Example: | | |
| 11 ........ O-cresol ................... | 2,100 | 93 |
| 12 ........ n-Butanol ................. | 700 | 34 |
| 13 ........ Bisphenol-A .............. | 1,140 | 64 |
| 14 ........ Thiophenol ................ | 10,20 | 80 |
| 15 ........ N-methyl aniline .......... | 1,000 | >95 |
| 16 ........ Tridecyl acid phosphate ... | 1,250 | 90 |

These examples illustrate the utilization of reagents that react preferentially with phosphorus trichloride to act as passivating agents.

What is claimed is:

1. A process for separating a mixture of an alkyl phosphonus dihalide, wherein the alkyl is of 1 to 4 carbon atoms, and phosphorus trihalide, in which the halogen is selected from the group consisting of chlorine and bromine, which comprises adding a passivating agent selected from the group consisting of phenol, orthocresol, normal butanol, bisphenol-A, thiophenol, N-methyl aniline, and tridecyl acid phosphate to said mixture, said passivating agent preferentially reacting with the phosphorus trihalide, and then recovering the alkyl phosphonus dihalide.

2. A process according to claim 1, wherein the passivating agent is phenol.

3. A process according to claim 1, wherein the alkylphosphonous dihalide is recovered by distillation thereof.

4. A process according to claim 1, wherein the alkyl phosphonous dihalide is an alkyl phosphonous dichloride and the phosphorus trihalide is phosphorus trichloride.

5. The process in accordance with claim 4, wherein the alkyl group of the alkylphosphonous dihalide is of 1 to 2 carbon atoms.

6. A process according to claim 5, wherein the alkylphosphonous dihalide is methylphosphonous dichloride.

References Cited

UNITED STATES PATENTS 3,210,418  10/1965  Pianfetti.

OTHER REFERENCES

Pianfetti et al.: J. Am. Chem. Soc., vol. 84, pp. 851–854, March 1962.

Steacie: "Atomic and Free Radical Reactions," vol. 2, chap. 10, pp. 657–699 (pp. 657–667, 682 and 689 particularly relied upon), Reinhold Publishing Co., New York (1954).

LORRAINE A. WEINBERGER, Primary Examiner

E. J. GLEIMAN, Assistant Examiner